(12) United States Patent
Weber et al.

(10) Patent No.: US 12,528,130 B2
(45) Date of Patent: Jan. 20, 2026

(54) METHOD FOR DETERMINING A SHARPNESS CONDITION OF A SAW CHAIN OF A CHAIN SAW

(71) Applicant: Andreas Stihl AG & Co. KG, Waiblingen (DE)

(72) Inventors: Marco Weber, Backnang (DE); Thomas Lux, Alfdorf (DE); Luis Jaeger, Stuttgart (DE); Siddharth Baburaj, Freiburg im Breisgau (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 276 days.

(21) Appl. No.: 18/045,723

(22) Filed: Oct. 11, 2022

(65) Prior Publication Data
US 2023/0115313 A1 Apr. 13, 2023

(30) Foreign Application Priority Data
Oct. 12, 2021 (EP) ..................................... 21202256

(51) Int. Cl.
*B23D 63/16* (2006.01)
*G01B 5/20* (2006.01)
(Continued)

(52) U.S. Cl.
CPC ............... *B23D 63/16* (2013.01); *G01B 5/20* (2013.01); *G01B 5/24* (2013.01); *G06T 7/0002* (2013.01)

(58) Field of Classification Search
CPC .......... G06K 9/62; B23Q 15/16; B23Q 23/00; B23Q 35/22; B23Q 17/09; B23Q 17/0995;
(Continued)

(56) References Cited

U.S. PATENT DOCUMENTS 5,115,403 A * 5/1992 Yoneda .................... G01N 3/58
702/41
6,105,446 A 8/2000 Rein
(Continued)

FOREIGN PATENT DOCUMENTS

CN 111383227 A 7/2020
DE 27 27 447 A1 4/1978
(Continued)

OTHER PUBLICATIONS

CN111383227A English Translation; Unannounced Invensor; Jul. 7, 2020; G06F18/214.*
(Continued)

*Primary Examiner* — Laura M Lee
(74) *Attorney, Agent, or Firm* — Walter Ottesen, P.A.

(57) ABSTRACT

A method is for determining a sharpness condition of a saw chain of a chain saw. The saw chain includes at least one cutting link having an upper cutting blade. An upper cutting blade image of the upper cutting blade of the cutting link is recorded using an imaging device. An evaluation of the upper cutting blade image is performed using an evaluation unit, which includes an artificial neural network. A sharp condition and a dull condition of the saw chain are defined in the evaluation unit. The saw chain is assigned on the basis of the upper cutting blade image using the artificial neural network to the sharp condition or the dull condition.

12 Claims, 7 Drawing Sheets

(51) Int. Cl.
*G01B 5/24* (2006.01)
*G06T 7/00* (2017.01)

(58) Field of Classification Search
CPC .. B23Q 17/2457; B23D 63/16; B23D 59/001; B23D 3/16; B26D 7/12; B25F 5/00; G05B 19/4065; G05B 2219/37252; G05B 13/048
USPC .......................................................... 706/12
See application file for complete search history.

(56) References Cited

U.S. PATENT DOCUMENTS

| | | | | |
|---|---|---|---|---|
| 12,224,545 | B2* | 2/2025 | Radtke | B25F 5/00 |
| 2016/0263674 | A1* | 9/2016 | Laliberte | B23D 45/067 |
| 2016/0375570 | A1* | 12/2016 | Boeck | G05B 19/4062 |
| | | | | 700/169 |
| 2018/0272491 | A1* | 9/2018 | Yang | B23Q 17/0971 |
| 2018/0275630 | A1* | 9/2018 | Kao | G05B 19/4065 |
| 2018/0278494 | A1* | 9/2018 | Chen | B23Q 17/0971 |
| 2019/0143467 | A1* | 5/2019 | Wang | G05B 19/4065 |
| | | | | 700/175 |
| 2019/0227528 | A1* | 7/2019 | Abbott | G05B 13/0265 |
| 2019/0299352 | A1* | 10/2019 | Michiwaki | B23B 51/00 |
| 2020/0030936 | A1* | 1/2020 | Knudson | G06Q 10/06395 |
| 2020/0209831 | A1* | 7/2020 | Chen | G06N 3/084 |
| 2021/0173378 | A1* | 6/2021 | Rickey | B25F 5/00 |
| 2022/0379511 | A1* | 12/2022 | Girolami | B26D 5/007 |
| 2024/0020638 | A1* | 1/2024 | Adcock | G06Q 10/087 |
| 2024/0190032 | A1* | 6/2024 | Otto | B27B 17/025 |

FOREIGN PATENT DOCUMENTS

| | | |
|---|---|---|
| DE | 34 10 149 A1 | 10/1985 |
| EP | 0 949 480 A2 | 10/1999 |
| JP | 2005-37221 A | 2/2005 |
| WO | 01/07868 A1 | 2/2001 |
| WO | 2013/102900 A1 | 7/2013 |
| WO | 2020/251535 A1 | 12/2020 |

OTHER PUBLICATIONS

Anonymous, "kriege kette einfach nicht mehr scharf . . . -Motorsaegen-Portal", Oct. 3, 2017, XP055870396, URL: http://motorsaegen-portal.de/viewtopic.php?f=65&t=102332&start=20, found on Dec. 8, 2021. 7 pages.

Anonymous, "20171003-195006.jpg", Oct. 3, 2017, XP055870398, URL:https://www.dropbox.com/s/x7mb3i6jvhux5cx/20171003_195006.jpg?dl=0, found on Dec. 8, 2021. 1 page.

Pan, S. et al, "A Survey on Transfer Learning", IEEE Transactions on Knowledge and Data Engineering, vol. 22, No. 10, Oct. 2020, pp. 1345 to 1359.

Ren, S. et al, "Faster R-CNN: Towards Real-Time Object Detection with Region Proposal Networks", arXiv: 1506/.01497v3 [cs.CV], Jan. 6, 2016, pp. 1 to 14.

Anonymous, "kriege kette einfach nicht mehr scharf . . . -Motorsaegen-Portal", Oct. 3, 2017, XP055870396, URL: http://motorsaegen-portal.de/viewtopic.php?f=65&t=102332&start=20, found on Dec. 8, 2021,7 pages (pp. 1 to 3 cited in the EPSR of May 13, 2022) and English translation.

* cited by examiner

METHOD FOR DETERMINING A SHARPNESS CONDITION OF A SAW CHAIN OF A CHAIN SAW

CROSS REFERENCE TO RELATED APPLICATION

This application claims priority of European patent application no. 21 202 256.0, filed Oct. 12, 2021, the entire content of which is incorporated herein by reference.

TECHNICAL FIELD

The disclosure relates to a method for determining a sharpness condition of a saw chain of a chain saw.

BACKGROUND

When using a chain saw having a saw chain, the sharpness condition of the saw chain is of decisive importance for efficient and comfortable work. The saw chain becomes dull after a long period of use due to wear. This can significantly reduce the sawing performance. Working with a dull saw chain is difficult, time-consuming, and sometimes provides an unsatisfactory cutting result.

To reliably check whether the reduction of the sawing performance is actually due to a dull saw chain, various approaches have been followed up to this point in the prior art. For example, attempts have been made to infer the sharpness condition of the saw chain on the basis of the evaluation of the shape of the sawdust. However, the shape of the sawdust is influenced by too many influencing factors. This also applies to a temperature measurement on the saw chain. The temperature of the saw chain is not only dependent on the sharpness of the saw chain, but also, for example, on the moisture of the cut wood. A further approach is measuring the width of the upper cutting blade of one or more cutting links of the saw chain. For this purpose, a photo of the upper cutting blade is typically made. Due to the small size of an upper cutting blade, such a photo has to have a very high resolution, however. For an automated evaluation of such a photo, it is necessary for the photo to be recorded under absolutely reproducible, uniform conditions. Background, lighting conditions, and zoom detail are precisely specified. Such requirements, which are nearly equivalent to laboratory conditions, are impractical for rapid ascertainment of the sharpness condition of the saw chain. During use of the saw chain, it is impossible using such methods to establish quickly whether the condition of the saw chain is sharp or unsharp.

SUMMARY

It is an object of the disclosure to provide a method in such a way that rapid and simple determination of the sharpness condition of a saw chain of a chain saw is possible in a reliable manner independently of the prior knowledge of the user.

This object is, for example, achieved by a method for determining a sharpness condition of a saw chain of a chain saw, wherein the saw chain includes at least one cutting link having an upper cutting blade. The method includes: recording an upper cutting blade image of the upper cutting blade of the cutting link via an imaging device; and, performing an evaluation of the upper cutting blade image using an evaluation unit, wherein the evaluation unit includes a first artificial neural network, a sharp condition of the saw chain is defined in the evaluation unit, a dull condition of the saw chain is defined in the evaluation unit, and the saw chain is assigned to the sharp condition or the dull condition on a basis of the upper cutting blade image using the first artificial neural network.

According to the disclosure, the upper cutting blade image is evaluated using an evaluation unit which comprises an artificial neural network. A sharp condition of the saw chain and a dull condition of the saw chain are defined in the evaluation unit. The saw chain is assigned to the sharp condition or the dull condition on the basis of the upper cutting blade image using the artificial neural network. The artificial neural network for assigning the upper cutting blade image to the sharp or the dull condition is also referred to as the first artificial neural network.

The use of the artificial neural network enables the assignment of the upper cutting blade image to the sharp condition or the dull condition in a simple, rapid, and reproducible manner, independently of the knowledge of a user. No technical knowledge or communication with a person skilled in the art is necessary. The evaluation can take place at any time directly at the usage location.

The definition of the sharp condition and the dull condition can be provided, for example, in that the output signals of the evaluation of the pixels of the upper cutting blade image have to meet specific criteria. The pixels of the upper cutting blade image are expediently the input values of the artificial neural network. In particular a relative position in relation to the other pixels, preferably to a reference pixel, and a color value are assigned to each pixel. The color value can be, for example, an RGB value or a CMYK value or a comparable color specification. Due to the use of the artificial neural network, the method provides reliably good results even in greatly varying conditions during the recording of the upper cutting blade image. The artificial neural network advantageously makes use of a data set made up of upper cutting blade images which are assigned to either the sharp condition or the dull condition. On the basis of this data set, the artificial neural network can decide whether the saw chain, of which a new upper cutting blade image is recorded, is to be assigned to the dull condition or the sharp condition. From the data set and the specification of the assignment to the sharp condition or the dull condition, the neural network has learned to weight and evaluate various input parameters, various neurons, and various neuron layers in such a way that with high probability of success, the upper cutting blade image of a saw chain having unknown sharpness condition is correctly assigned to the sharp condition or the dull condition. In particular, the probability of success for a correct assignment of the upper cutting blade image to the sharp condition or the unsharp condition is at least 70%, advantageously at least 80%, preferably at least 90%. It can be provided that the learned weighting of the input parameters is stored as weighting parameters in the neural network. Upon a storage of the weighting parameters in the neural network, it can be provided that no data set of upper cutting blade images having known assignment to the sharp condition or the dull condition is stored in the neural network.

In particular, the upper cutting blade image is recorded under undefined light conditions at an undefined angle. Accordingly, reproducible recording conditions do not have to be ensured to achieve a reliably correct assignment to the sharp condition or the dull condition.

The upper cutting blade image is advantageously transferred in digital form to the evaluation unit. A rapid assignment to the sharp condition or dull condition is thus possible.

The upper cutting blade image advantageously has a resolution of at least 10 pixels/mm, in particular of at least 12 pixels/mm. The resolution is thus sufficiently high to enable a reliable and rapid assignment to the sharp condition or the dull condition of a saw chain with the aid of a method according to the disclosure.

In an embodiment of the disclosure, it is provided that the upper cutting blade image has a resolution of at most 128 pixels/mm, in particular at most 110 pixels/mm, in particular at most 100 pixels/mm, in particular at most 90 pixels/mm, in particular at most 64 pixels/mm, in particular at most 32 pixels/mm, preferably at most 24 pixels/mm. It is thus possible to also create upper cutting blade images using a comparatively cost-effective imaging device and nonetheless to achieve a reliably correct assignment to the sharp condition or the dull condition. When producing upper cutting blade images in digital form, the file size is small due to the limits of the resolution. Storage space can thus be saved. The upper cutting blade image can be transferred rapidly to the evaluation unit. An upper cutting blade image having a low resolution can be processed rapidly in the evaluation unit using the neural network.

In particular, a method for determining the sharpness condition of the saw chain also functions with an upper cutting blade image having a resolution of at most 128 pixels/mm, in particular at most 110 pixels/mm, in particular at most 100 pixels/mm, in particular at most 90 pixels/mm, in particular at most 64 pixels/mm, in particular at most 32 pixels/mm, preferably at most 24 pixels/mm with a success rate for a correct assignment of at least 80%, in particular of at least 90%.

The imaging device advantageously has an image sensor having at most 12 megapixels, in particular having at most 10 megapixels. The image sensor expediently has a maximum size of 7.2 mm×5.4 mm, in particular at most 5.8 mm×4.3 mm, in particular at most 5.4 mm×4.0 mm, preferably at most 4.5 mm×3.4 mm. The various maximum sizes of the image sensor can be combined arbitrarily with the various numbers of megapixels.

The evaluation unit and artificial neural network are expediently configured so that even in an imaging device having an image sensor having at most 12 megapixels and a maximum size of 7.2 mm×5.4 mm, in particular at most 4.5 mm×3.4 mm, a success rate for a correct assignment of at least 80%, in particular of at least 90% is achieved. It can also be provided that the evaluation unit and artificial neural network are configured so that even in an imaging device having an image sensor having at most 10 megapixels and a maximum size of 5.8 mm×4.3 mm, in particular at most 4.5 mm×3.4 mm, a success rate for a correct assignment of at least 80%, in particular at least 90% is achieved.

In an embodiment of the disclosure, it is provided that during the evaluation of the upper cutting blade image, initially an image detail is selected which shows the upper cutting blade, in particular a cutting edge of the upper cutting blade. The number of the pixels of the image detail is expediently at most 64 pixels×64 pixels, in particular at most 32 pixels×32 pixels. In particular, the selection of the image detail is carried out with the aid of a second artificial neural network. The evaluation unit advantageously comprises the second artificial neural network. The second artificial neural network is expediently part of the evaluation unit. In particular, the second artificial neural network is trained to recognize upper cutting blades, in particular cutting edges. The second artificial neural network is in particular a "convolutional neural network". This may be translated approximately as "folding neural network". The neural network VGG16 is expediently used as a second artificial neural network. However, the artificial neural network Mobile Net V2 can also be used as a second artificial neural network.

Expediently, a region of the upper cutting blade image in which the upper cutting blade is located is selected with the aid of the second artificial neural network before the assignment of the upper cutting blade image to the sharp state or the dull state via the first artificial neural network. In particular, the upper cutting blade image is cropped to this region.

The artificial neural network and/or the second artificial neural network is advantageously a network pre-trained on extensive data sets of image data from various domains, as is provided in "transfer learning". In this regard, reference is made to the publication by S. J. Pan and Q. Yang, "A Survey on Transfer Learning," in IEEE Transactions on Knowledge and Data Engineering, vol. 22, no. 10, pp. 1345-1359, October 2010, doi: 10.1109/TKDE.2009.191, the content of the disclosure of which is incorporated completely into the present description. In "transfer learning", a pre-trained network is modified. Less than 0.1% of the parameters thus have to be trained. Without "transfer learning", at least 20,000 images would have to be used as training data. Significantly less training data are required due to the "transfer learning". The training time can thus be significantly shortened and nonetheless a high level of accuracy can be achieved.

In the selection of the image detail via the second artificial neural network, an algorithm based on a R-CNN (region-based convolutional neural network) algorithm can preferably be applied, which enables real-time object recognition. The R-CNN algorithm is in particular a faster R-CNN algorithm. In this regard, reference is made to the publication by Shaoqing Ren, Kaiming He, Ross Girshick, and Jian Sun, "Faster R-CNN: Towards Real-Time Object Detection with Region Proposal Networks", arXiv:1506.01497v3 [cs.CV], 6 Jan. 2016, https://doi.org/10.48550/arXiv.1506.01497, the content of the disclosure of which is incorporated completely into the present description. The R-CNN algorithm identifies object regions and calculates their boundary frame. The image detail lies within the boundary frame.

In particular, in the selection of the image detail, the image is first brought into a square format. Via the second neural network, in particular via the "faster R-CNN algorithm", a ROI (region of interest), or the image detail in which the upper cutting blade is located, is then ascertained and selected.

The assignment of the associated upper cutting blade image to the sharp condition or the dull condition preferably only takes place following the selection of the image detail in the image detail.

Expediently, both the artificial neural network for assigning the upper cutting blade image to the sharp condition or the dull condition and also the second artificial neural network for selecting the region of the upper cutting blade image in which the upper cutting blade is located are part of the evaluation unit. A rapid and simple evaluation can thus take place in the evaluation unit. It is not necessary to load the data sets into various devices.

Advantageously, the further evaluation of the upper cutting blade image for the assignment to the sharp condition or the dull condition is performed exclusively on the basis of the image detail.

Advantageously, for the successful assignment of the saw chain to the sharp condition or the dull condition, the resolution of the upper cutting blade image can be less by at least a factor of 10 than in a conventional measuring method for sharpness determination via measuring a width of the upper cutting blade from an upper cutting blade image, wherein the measurement error for measuring the width in a conventional measuring method is less than 1%. In conventional measuring methods, it is known that the assignment to a dull condition or sharp condition can be decided via a limiting value for the width of the upper cutting blade. The upper cutting blade has a cutting edge which extends in a longitudinal direction. The width of the upper cutting blade is measured perpendicularly to the longitudinal direction of the edge of the upper cutting blade. An imaginary, ideal upper cutting blade has two flanks which meet at an acute angle at the cutting edge. The two flanks may be described by planes. In reality, the edge of the upper cutting blade is always rounded. However, planes may be applied to the planar flanks of the upper cutting blade, so that the planar flanks each extend in one of the planes. The planes are oriented at an acute angle in relation to one another. The two points or lines at which the two flanks each just still touch the planes are the points or lines between which the width of an upper cutting blade is measured.

The length of the cutting edge of an upper cutting blade is typically from 3 mm to 5 mm. With such small object sizes, a very high resolution of an upper cutting blade image is necessary to obtain a measurement error of less than 1% when measuring the width of the upper cutting blade. A measurement error of less than 1% is necessary to be able to make a statement at all as to whether the upper cutting blade and the associated saw chain are sharp or dull. In the present case, the requirement for the resolution of the upper cutting blade image is advantageously less by at least a factor of 10 than in conventional measuring methods. A decision can be made reliably as to whether the saw chain is to be assigned to the sharp condition or the dull condition even using a resolution of the upper cutting blade image that is less by a factor of 10.

The upper cutting blade 4 is formed on the roof section 18. The roof section 18 has a height h. The height h of the roof section 18 is measured in the running direction 25 of the saw chain 1. The height h of the roof section 18 is less than 8 mm, in particular less than 6 mm. The running direction 25 extends transversely to the longitudinal direction of the cutting edge of the upper cutting blade 4. The height h of the roof section 18 is at least 1 mm, in particular at least 2 mm.

In particular, the width of the upper cutting blade is less than 500 μm, in particular less than 300 μm, in particular less than 150 μm.

In an embodiment of the disclosure, precisely two conditions for the sharpness condition of the saw chain are defined in the evaluation unit. A rapid decision as to which condition the saw chain is to be assigned is thus possible. The user receives a clear statement as to whether the saw chain can be used further or not.

A data set of digital images of upper cutting blades of sharp saw chains and of upper cutting blades of dull saw chains is expediently stored in the artificial neural network. A saw chain is advantageously designated as sharp if it supplies at least 80%, in particular at least 70% of the cutting performance of a reference saw chain in identical working conditions. In particular, a saw chain is designated as dull if it supplies at most 65%, in particular at most 60% of the cutting performance of the reference saw chain in identical working conditions. The sharp saw chains are advantageously assigned to the sharp condition and the dull saw chains are assigned to the dull condition. An intermediate condition can also be provided in which the saw chain is categorized neither as dull nor as sharp.

A threshold value for the cutting performance of a saw chain in comparison to a reference saw chain can advantageously be specified by the user, which separates the sharp condition from the dull condition. On the basis of this specified threshold value, the neural network then assigns the images of upper cutting blades stored in the data set to the sharp condition or the dull condition. It can also be provided that the user selects between a professional mode and a hobby mode. This information is then transmitted to the neural network. In the professional mode, the threshold value is preferably 80%. In the hobby mode, the threshold value is preferably 70%.

It can also be provided that saw chains are designated as sharp when they supply at least 70% of the cutting performance of the reference saw chain in identical working conditions. Saw chains are then designated as dull when they supply less than 70% of the cutting performance of the reference saw chain in identical working conditions.

In particular, the artificial neural network decides on the basis of the data set and the upper cutting blade image whether the saw chain is to be assigned to the dull condition or the sharp condition.

However, it can also be provided that in the evaluation unit, the weighting parameters obtained from the training of the artificial neural network using the data set of digital images are stored. These weighting parameters can be stored alternatively or additionally to the data set of digital images in the evaluation unit. The artificial neural network advantageously generates the weighting parameters itself by computational trials. The computational trials which supply the predetermined result using the data set of digital images decide about which parameters are important and how they are weighted. This information is then stored in the form of the weighting parameters. These weighting parameters can be applied in the upper cutting blade image of a saw chain having unknown sharpness condition. The weighting parameters are advantageously determined on the basis of digital images on which upper cutting blades are recorded in the clean state in front of an identical, in particular dark, background. In particular, the digital images for training the artificial neural network are recorded under identical recording conditions. Successful training of the neural network is thus possible even with a very small data set. The data set advantageously comprises at least 1000, in particular at least 1500, in particular at least 8000 digital images. In particular, the data set comprises fewer than 2500 digital images. It can also be provided that the data set comprises, instead of the mentioned minimum and maximum numbers of digital images, corresponding minimum and maximum numbers of weighting parameters. The digital images advantageously have a resolution of at least 10 pixels/mm, in particular at least 12 pixels/mm. The digital images advantageously have a resolution of at most 128 pixels/mm, in particular at most 64 pixels/mm, in particular at most 32 pixels/mm, preferably at most 24 pixels/mm. The digital images are preferably recorded using a flash.

In an embodiment of the disclosure, it can be provided that the neural network continues to be fed with data during use. The recorded upper cutting blade images can be linked here to other measured variables, such as for example, the temperature of the saw chain. It can be provided that inferences about the condition of the saw chain are also drawn therefrom. The neural network can thus continue to learn. It can also be provided that these data arising during use are centrally collected, for example, by a wireless connection of a control unit to a central collection point.

The evaluation unit expediently indicates the sharpness condition of the saw chain in the form of a display as sharp or dull. The user thus has immediate information as to whether the examined saw chain is dull or sharp.

In an embodiment of the disclosure, the upper cutting blade image is recorded using a flash. It has been shown that an upper cutting blade of a dull saw chain reflects the flash to a greater extent than the upper cutting blade of a sharp saw chain. Very many more brighter pixels can therefore be recognized in the upper cutting blade image in the case of a dull saw chain than in the case of a sharp saw chain. This clear difference in the upper cutting blade images of sharp and dull saw chains which were recorded using flash significantly facilitates the evaluation in the evaluation unit. An assignment to the sharp condition or the dull condition is possible even more reliably.

In an embodiment of the disclosure, the evaluation unit outputs a directive on the basis of the ascertained sharpness condition of the saw chain. In particular, the directive comprises an instruction to resharpen the saw chain. The instruction to resharpen the saw chain preferably comprises the specification of the required tool, in particular of a file type. It can also be provided that the directive comprises a purchase recommendation for a replacement part, in particular for a new saw chain, a new sprocket, and/or a new guide bar. Users thus know directly what they have to do to have a sufficiently sharp saw chain available again.

In an embodiment of the disclosure, it is provided that at least two, in particular at least three upper cutting blade images of at least two, in particular at least three different upper cutting blades of the saw chain are made, and that the evaluation evaluates the at least two, in particular the at least three upper cutting blade images to decide whether the saw chain is to be assigned to the dull condition or the sharp condition. Even better reliability of the assignment to the sharp condition or to the dull condition of the saw chain can thus be achieved. This can be advantageous in particular due to the small size of the upper cutting blades and the small width of an upper cutting blade.

The at least two, in particular three upper cutting blade images are advantageously recorded from two, in particular three different angles. With approximately uniform positioning of the imaging device, the saw chain or the upper cutting blade can be rotated around a first axis after the production of the first upper cutting blade image, and in particular after production of the second upper cutting blade image can be rotated around a second axis of rotation perpendicular to the first axis of rotation for the production of the third upper cutting blade image. Upper cutting blade images from undefined angles can result in this case.

In an embodiment of the disclosure, the imaging device and the evaluation unit are integrated together into a single portable apparatus. This facilitates the recording and evaluation of an upper cutting blade image. Rapid and uncomplicated performance of the method is possible.

BRIEF DESCRIPTION OF THE DRAWINGS

The invention will now be described with reference to the drawings wherein.

DESCRIPTION OF THE PREFERRED EMBODIMENTS

Figure 1:
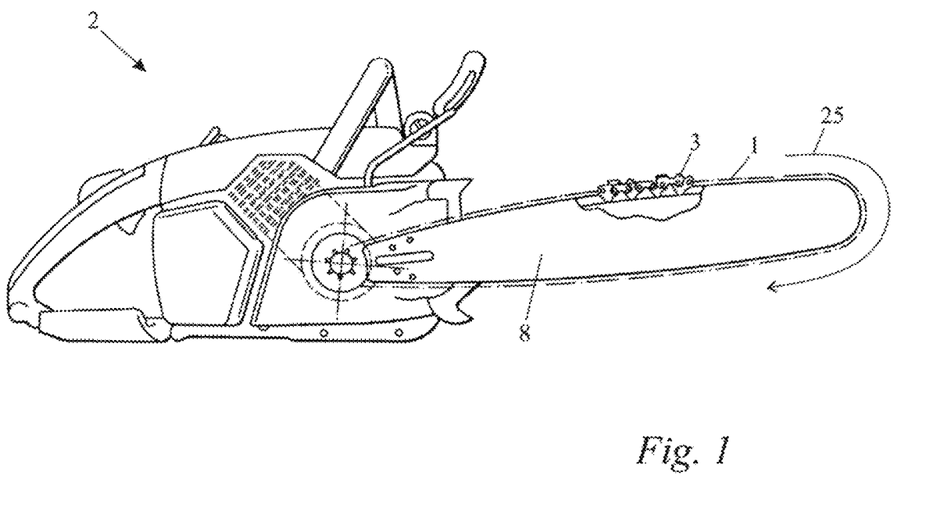
FIG. 1 shows a schematic representation of a chain saw having a saw chain.
Figure 2:
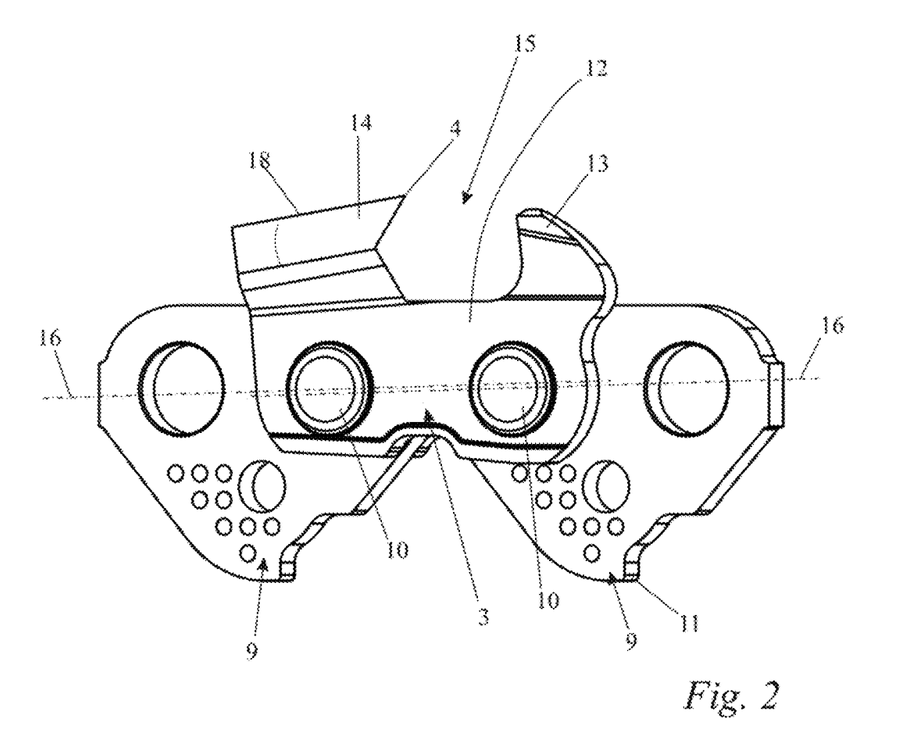
FIGS. 2 and 3 show perspective representations of a detail of the saw chain.
Figure 3:
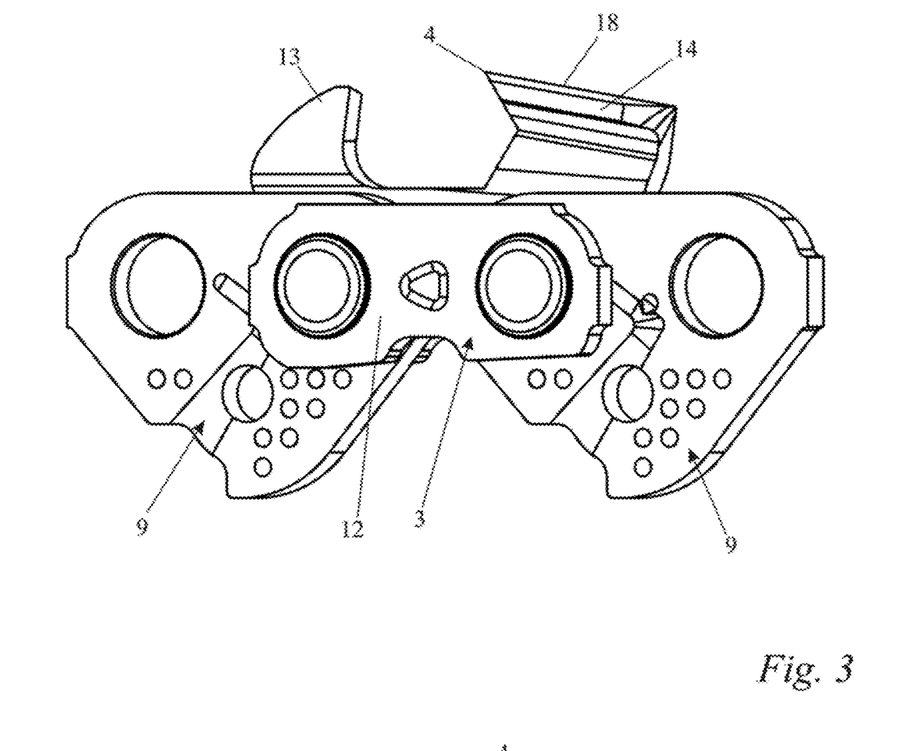

FIG. 1 shows a schematic representation of a chain saw 2. The chain saw 2 has a saw chain 1. The saw chain 1 circulates on a guide bar 8. The saw chain 1 circulates in a running direction 25 around the guide bar 8. The saw chain 1 is driven by a motor (not shown). The saw chain 1 comprises a cutting link 3.

FIGS. 2 to 5 show a section of the saw chain 1. The saw chain 1 has drive links 9. The drive links 9 are connected via connecting pins 10 to the cutting link 3. The drive link 9 has a drive base 11. As the saw chain 1 circulates around the guide bar 8, the drive base 11 of the drive link 9 protrudes into a guide groove of the guide bar. The drive bases 11 are driven by a drive pinion of the chain saw 2. The connecting pins 10 are arranged on bearing points of the cutting link 3. The bearing points each have longitudinal center axes 16, which form the pivot axes of the links of the saw chain 1. The longitudinal center axes 16 span a bearing point plane 17 shown in FIG. 4. The bearing points are formed in a base body 12 of the cutting link 3. The base body 12 is preferably made planar. A depth delimiter 13 and a cutting tooth 14 are arranged on the base body 12. A cutout 15 is arranged between the depth delimiter 13 and the cutting tooth 14.

The cutting tooth 14 has a roof section 18, in which the cutting tooth 14 extends approximately in parallel to the longitudinal center axes 16 or to the bearing point plane 17. The roof section 18 has an upper cutting blade 4. The upper cutting blade 4 is provided to engage in a workpiece. The upper cutting blade 4 is a cutting edge. The upper cutting blade 4 is the region of the cutting tooth 14 which is located farthest to the front in the running direction of the saw chain 1.

Figure 7:
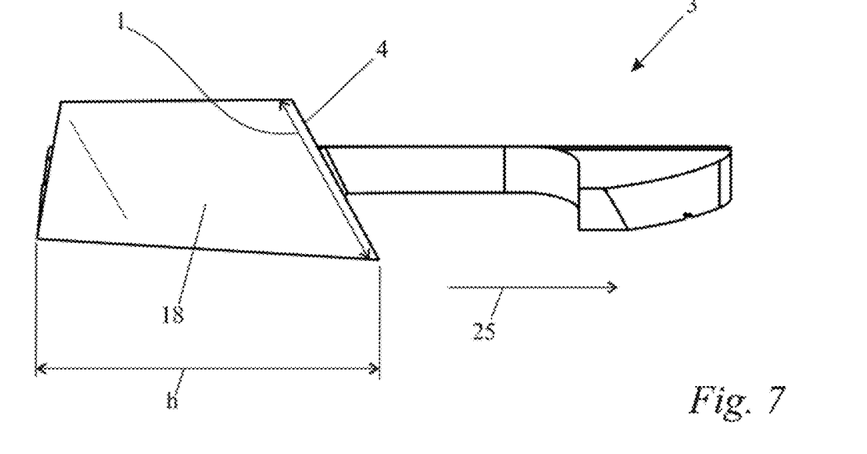
FIG. 7 shows a top view of the cutting link in the direction of arrow VII in FIG. 6.
Figure 8:
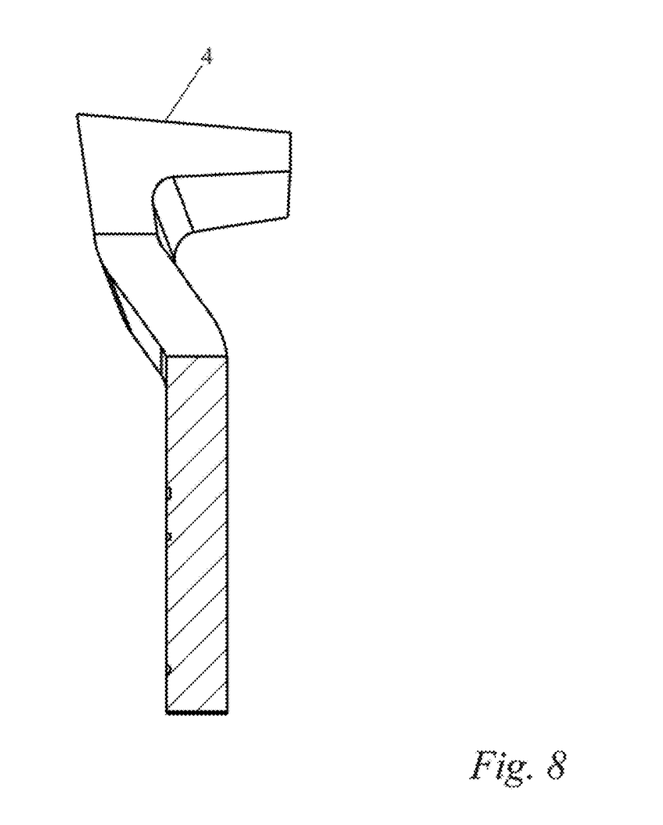
FIG. 8 shows a section along line VIII-VIII in FIG. 6.

FIG. 7 shows a top view from above of the roof section 18 of the cutting tooth 14. The upper cutting blade 4 runs transversely, in the embodiment diagonally to the running direction 25 of the saw chain 1. The upper cutting blade 4 extends along a longitudinal direction 26. The longitudinal direction 26 runs diagonally to the running direction 25. The upper cutting blade 4 has a length 1. The length 1 is measured in the longitudinal direction 26. The length 1 of the upper cutting blade 4 is from 3 mm to 5 mm.

The upper cutting blade 4 is formed on the roof section 18. The roof section 18 has a height h. The height h of the roof section 18 is measured in the running direction 25 of the saw chain 1. The height h of the roof section 18 is less than 8 mm, in particular less than 6 mm. The running direction 25 runs transversely to the longitudinal direction of the cutting edge of the upper cutting blade 4. The height h of the roof section 18 is at least 1 mm, in particular at least 2 mm.

Figure 4:
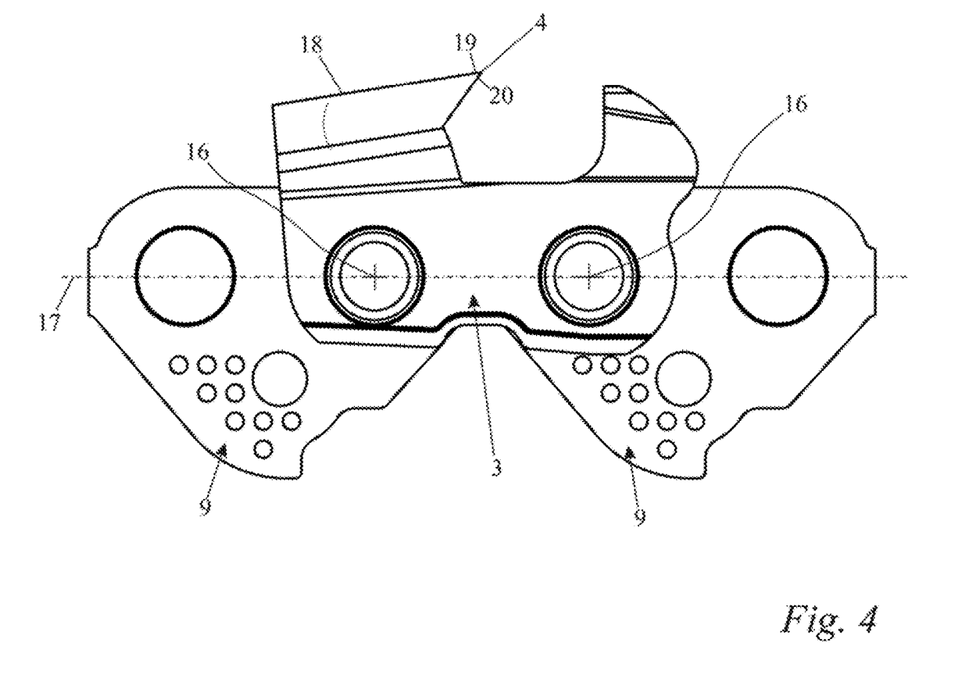
FIGS. 4 and 5 show side views of the detail of the saw chain from FIGS. 2 and 3.
Figure 5:
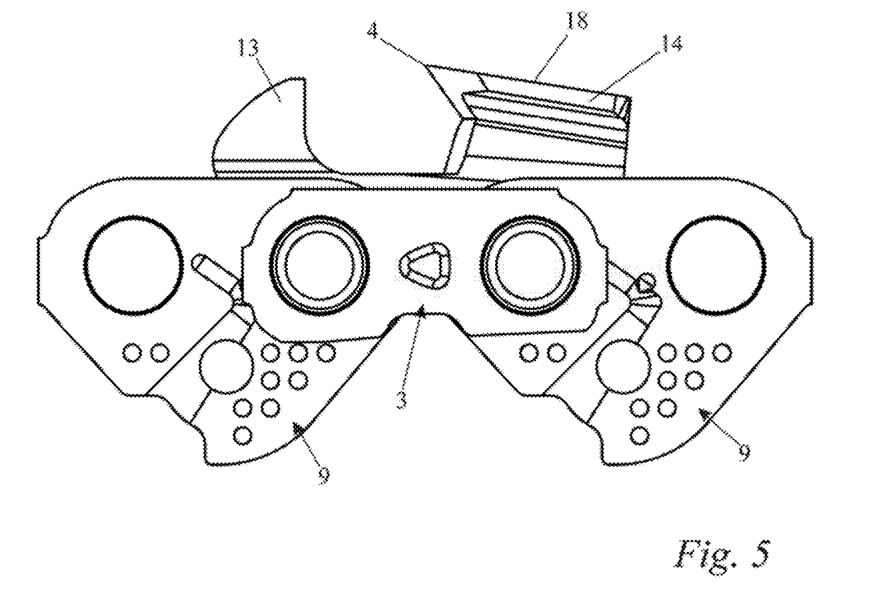
Figure 6:
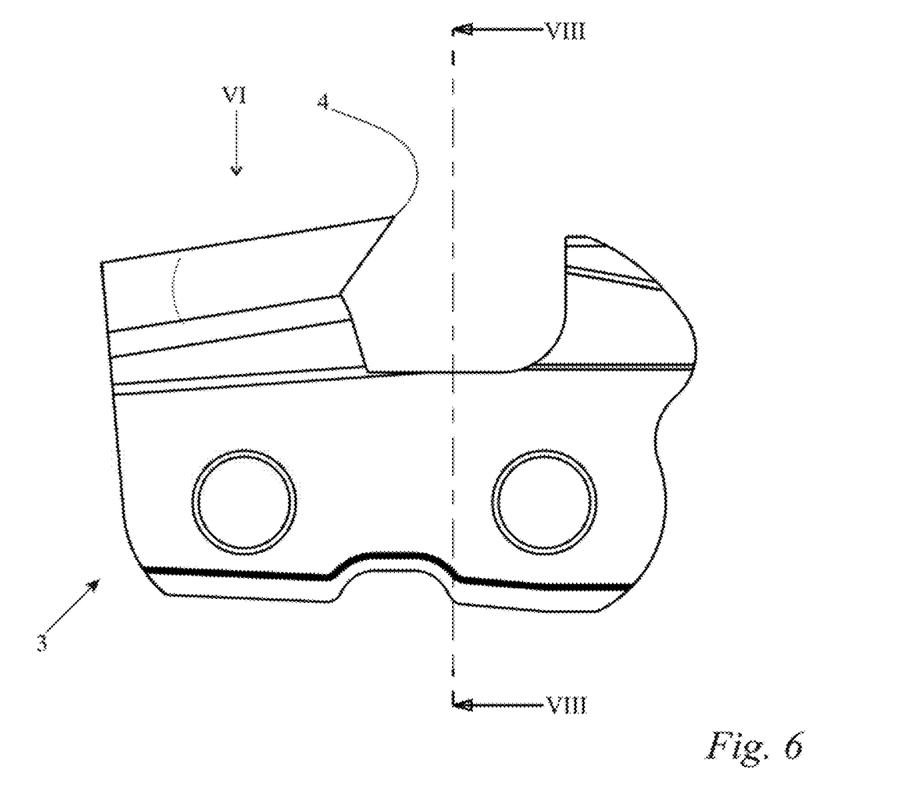
FIG. 6 shows a side view of a cutting link of the saw chain.

In operation of the chain saw 2, the saw chain 1 circulates around the guide bar 8. The cutting links 3 engage in the workpiece to be sawn. In this case, a cut is effectuated in the workpiece by the upper cutting blade 4. The upper cutting blade wears over time due to this use. As shown in FIG. 4, the upper cutting blade 4 has an upper flank 19 and a lower flank 20. The upper flank 19 is arranged on the outside as the saw chain 1 circulates around the guide bar 8. The lower flank 20 is arranged on the inside during the circulation around the guide bar 8. The upper flank 19 and the lower flank 20 each extend in different planes. The upper flank 19 and the lower flank 20 converge at an acute angle. The upper cutting blade 4 is formed at the tip of the converging flanks 19 and 20. The upper cutting blade 4 is gradually rounded due to the wearing out of the upper cutting blade 4 in operation. The saw chain 1 thus becomes unsharp.

Figure 9:
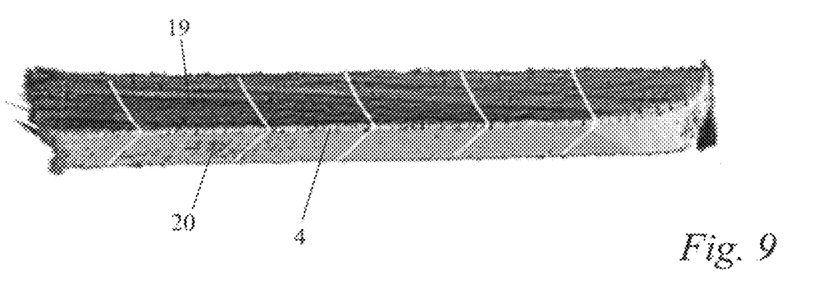
FIG. 9 shows a photo of an upper cutting blade of a cutting link of a sharp saw chain.
Figure 11:
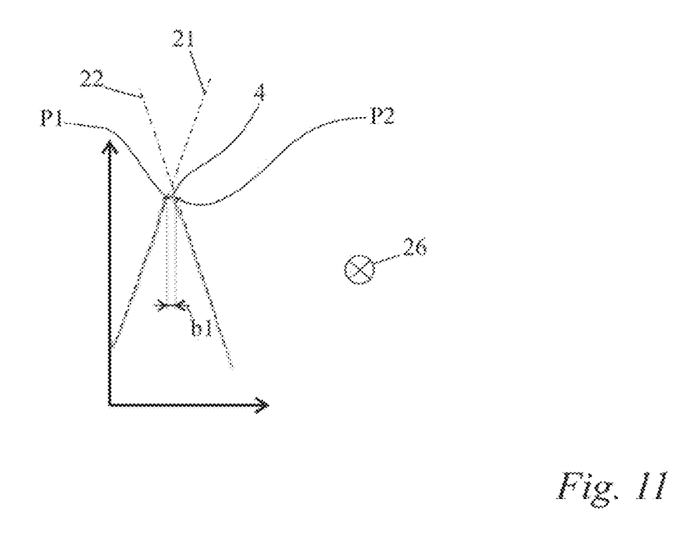
FIG. 11 shows height profiles of the upper cutting blade from FIG. 9.

FIG. 9 shows the photo of a sharp upper cutting blade 4. FIG. 11 shows height profiles of the sharp upper cutting blade 4 from FIG. 9. The x axis and the y axis span a plane perpendicular to the longitudinal direction 26 of the upper cutting blade 4. The upper flank 19 extends in an upper plane 21. The lower flank 20 extends in a lower plane 22. The upper flank 19 and the lower flank 20 are connected to one another via the upper cutting blade 4. The upper cutting blade 4 is close to the intersection line of the upper plane 21 and the lower plane 22 in the sharp condition. The upper cutting blade 4 is part of the cutting tooth 14 which is located between the upper flank 19 and the lower flank 20, but not in the upper plane 21 and not in the lower plane 22. The upper cutting blade 4 has a width b1 in the sharp condition. The width b1 is measured between two points P1 and P2, which each have the same distance to the intersection line between the upper plane 21 and the lower plane 22. The points P1 and P2 each have the same distance to the first contact point between the upper flank 19 and the upper plane 21 and to the first contact point between the lower flank 20 and the lower plane 22. The point P1 is assigned to the upper plane 21 and the point P2 is assigned to the lower plane 22. The two points P1 and P2 are located in a common plane which is perpendicular to the longitudinal direction 26 of the upper cutting blade 4. The width b1 extends in the direction of the x axis.

Figure 10:
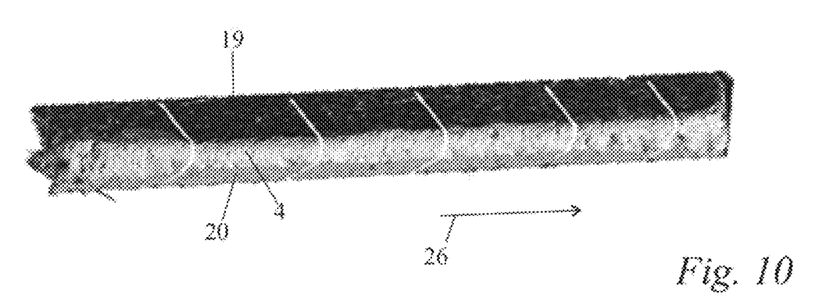
FIG. 10 shows a photo of an upper cutting blade of a cutting link of a dull saw chain.
Figure 12:
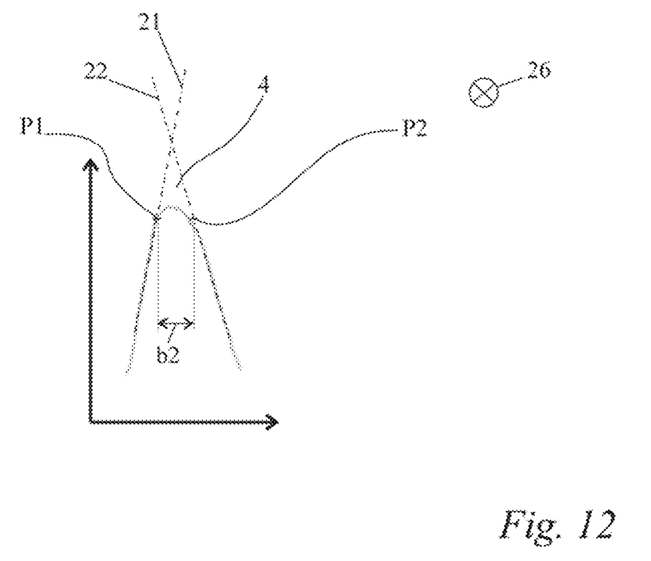
FIG. 12 shows height profiles of the upper cutting blade from FIG. 10.

FIG. 10 shows a photo of the upper cutting blade 4 after intensive use of the saw chain 1. FIG. 12 shows height profiles of the worn upper cutting blade 4 from FIG. 10. The representation is similar to that for the sharp upper cutting blade 4 in FIG. 11. A width b2 of the dull upper cutting blade 4 is measured similarly to the width b1 of the sharp upper cutting blade 4. The width b2 of the dull upper cutting blade 4 is greater than the width b1 of the sharp upper cutting blade 4. The width b1, b2 of the upper cutting blade 4 is less than 1 mm, in particular less than 750 µm, in particular less than 500 µm, in particular less than 300 µm. The width b1 of a sharp upper cutting blade 4 is less than 100 µm. The width b2 of a dull upper cutting blade 4 is less than 200 µm. The width b1 of a sharp upper cutting blade 4 is at least 10 µm. The width b2 of a dull upper cutting blade 4 is at least 80 µm.

Figure 13:
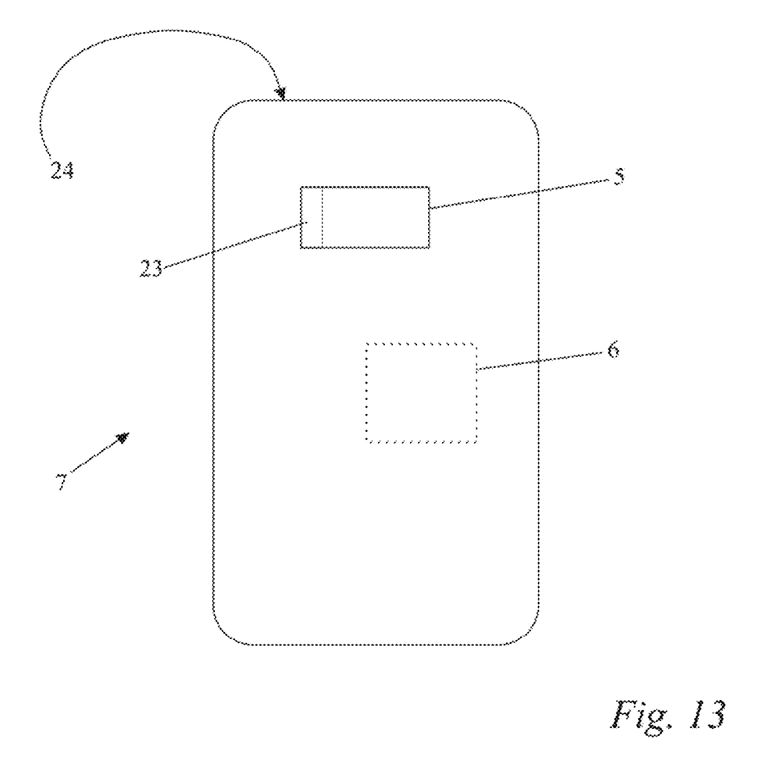
FIG. 13 shows a schematic representation of a portable apparatus having an imaging device and an evaluation unit; and, FIG. 14 shows a flow chart of a method sequence.

FIG. 13 shows a schematic representation of a portable apparatus 7. The portable apparatus 7 is used to determine a sharpness condition of the saw chain 1. The portable apparatus 7 comprises an imaging device 5 and an evaluation unit 6. The imaging device 5 and the evaluation unit 6 are integrated into the portable apparatus 7. However, performing the determination of the sharpness condition of the saw chain 1 using an imaging device and an evaluation unit which are formed completely separately from one another can also be provided. In the embodiment, the portable apparatus 7 is a mobile telephone.

The imaging device 5 has an image sensor having at most 12 megapixels. It can also be provided that the image sensor has at most 10 megapixels. The image sensor has a maximum size of 7.2 mm×5.4 mm. It can also be provided that the image sensor has a maximum size of at most 4.5 mm×3.4 mm. Any combination of the mentioned number of pixels and the mentioned maximum sizes of the sensor can be used.

To determine the sharpness condition of the saw chain 1 of the chain saw 2, an upper cutting blade image of the upper cutting blade 4 of the cutting link 3 is recorded using the imaging device 5. The upper cutting blade image is a photograph. The upper cutting blade image is a digital photograph. The imaging device 5 is a camera. The imaging device 5 is a digital camera. In the embodiment, the imaging device 5 is a mobile telephone camera.

An evaluation of the upper cutting blade image is performed using the evaluation unit 6. The evaluation unit 6 comprises an artificial neural network. In the embodiment, it is a "convolutional neural network". This may be translated approximately as "folding neural network".

In principle, the structure of a convolutional neural network includes one or more convolutional layers, followed by a pooling layer. This unit can repeat itself arbitrarily often in principle.

The activity of each neuron is calculated in the convolutional layer via a discrete convolution. A comparatively small convolution matrix (filter kernel) is moved step-by-step over the input here. The input of a neuron in the convolutional layer is calculated as the internal product of the filter kernel with the present underlying image detail in the form of several pixels. Adjacent neurons in the convolutional layer accordingly react to overlapping regions (similar frequencies in audio signals or local environments in images).

The subsequent step is carried out in the pooling layer. Superfluous items of information are discarded here. For example, for object recognition in photos, the exact position of an edge in the photo can be of negligible interest—the approximate locating of a feature is sufficient. There are various types of pooling. By far the most widespread is max pooling, wherein from each 2×2 square made up of neurons of the convolutional layer, only the activity of the most active (therefore "max") neuron is retained for the further calculation steps; the activity of the remaining neurons is discarded. In spite of the data reduction (75% in the example), in general the performance of the network does not decrease due to the pooling.

In the embodiment, the convolutional neural network is a derivative of the neural networks designated by "feed forward". Feed forward neural networks includes an input layer and an output layer, and arbitrarily many concealed layers. Neurons of one layer are connected to all neurons of the layer following thereon and are called fully connected layers. The processing of the data only takes place from front to back. The convolutional neural network comprises a convolutional layer followed by a pooling layer. This sequence can be repeated arbitrarily often.

The artificial neural network can be, for example, the neural network VGG16. In the embodiment, the artificial neural network Mobile Net V2 is used. By modifying the already existing artificial neural network "Mobile Net V2", the number of classes can be reduced, for example, from 1000 to 2.

A sharp condition of the saw chain 1 is defined in the evaluation unit 6. A dull condition of the saw chain 1 is defined in the evaluation unit 6. The saw chain 1, of which the upper cutting blade image was recorded, is assigned on the basis of the upper cutting blade image using the artificial neural network to the sharp condition or the dull condition. The artificial neural network, which performs the final assignment of the upper cutting blade image to the sharp condition or to the dull condition, is also designated as the first artificial neural network.

A data set of digital images of upper cutting blades 4 of sharp saw chains 1 and of digital images of upper cutting blades 4 of dull saw chains 1 is stored in the artificial neural network. A saw chain 1 is designated as sharp when its cutting performance reaches 80% of the cutting performance of a reference saw chain in identical working conditions. A saw chain 1 is designated as dull when it reaches at most 65%, in particular at most 60% of the cutting performance of the reference saw chain in identical working conditions. The reference saw chain is a sharp saw chain. The width of the upper cutting blades of the reference saw chain is less than 50 µm. The width of the upper cutting blades of the reference saw chain is approximately 40 µm. However, it can also be provided that a saw chain is designated as sharp when it supplies at least 70% of the cutting performance of a reference saw chain in identical working conditions; a saw chain is designated as dull in this case when it supplies less than 70% of the cutting performance of the reference saw chain in identical working conditions.

Digital images of upper cutting blades 4 of sharp saw chains are assigned to the sharp condition. Digital images of upper cutting blades 4 of dull saw chains are assigned to the dull condition. By way of this assignment, the neural network can learn which parameters are particularly important for the assignment of a saw chain 1 having unknown sharpness condition. A weighting of the parameters can also be determined on the basis of this data set. The pixel values of the digital images are supplied as input values to the artificial neural network in the learning phase. The assignment of the digital image to the sharp condition or to the dull condition is also supplied to the artificial neural network in the learning phase. When a method according to the disclosure is used to determine the sharpness condition of a saw chain having unknown sharpness condition, the pixel values of the upper cutting blade image are supplied to the neural network as input values. A pixel value comprises the position specification of the pixel on the respective image in relation to other pixels and an assigned color value. Using these input pixel values, the neural network carries out its learned analysis method and assigns the saw chain, of which the upper cutting blade image was recorded, to the sharp condition or the dull condition. The learned analysis method includes the learned weighting of the individual image pixels. This weighting is performed in the form of a convolutional matrix. The convolutional matrix is learned.

The artificial neural network decides on the basis of the data set and the upper cutting blade image whether the saw chain 1 is to be assigned to the dull condition or the sharp condition.

Precisely two conditions for the sharpness condition of the saw chain 1 are defined in the evaluation unit 6. It can also be provided, however, that multiple conditions are defined for the sharpness condition of the saw chain 1.

No special recording conditions are to be provided to record the upper cutting blade image of the upper cutting blade 4, the sharpness condition of which is to be determined. The upper cutting blade image can be recorded under undefined light conditions. The upper cutting blade image can be recorded at an undefined angle. The imaging device 5 can be positioned arbitrarily. No special background is to be selected. The upper cutting blade image can be produced in front of an undefined background. No specific perspective has to be selected.

The upper cutting blade image is transferred in digital form to the evaluation unit 6. In the embodiment, the imaging device 5 is electronically connected to the evaluation unit 6 for this purpose.

In the embodiment, the evaluation unit 6 is a chip of the mobile telephone. An application is installed on the mobile telephone. The application is part of the method for determining the sharpness condition. The application is a program, using which the artificial neural network is implemented. The upper cutting blade image of the upper cutting blade 4 of the saw chain 1, the sharpness condition of which is to be determined, is supplied to the application. The application supplies the upper cutting blade image to the artificial neural network, which decides on the basis of the learned weighting parameters whether the saw chain 1 is to be assigned to the sharp condition or the dull condition.

The upper cutting blade image recorded using the imaging device 5 has a resolution of at least 10 pixels/mm, in particular at least 12 pixels/mm.

The upper cutting blade image has a resolution of at most 128 pixels/mm in the embodiment. However, it can also be provided that the upper cutting blade image has a resolution of at most 64 pixels/mm, in particular of at most 32 pixels/mm, in particular of at most 24 pixels/mm.

For a successful assignment of the saw chain 1 to the sharp condition or to the dull condition, the resolution of the upper cutting blade image can be less by at least a factor of 10 than in a conventional measuring method for determining the sharpness condition of a saw chain. In a conventional measuring method for determining the sharpness condition of a saw chain, the width of the upper cutting blade is measured from an upper cutting blade image. For this purpose, the measurement error has to be less than 1%. A very high resolution is thus required for the upper cutting blade image. At a width of the upper cutting blade of approximately 100 µm, for a measurement error less than 1%, a resolution for the upper cutting blade image of approximately 1000 pixels/mm is necessary to be able to make a reliable statement about the sharpness condition of the saw chain. In a method according to the disclosure for determining the sharpness condition using a neural network, a resolution of the upper cutting blade image of less than 100 pixels/mm is sufficient for a successful assignment to the sharp condition or the dull condition.

It can be provided that the upper cutting blade image is recorded using a flash. A flash device 23 is provided for this purpose (FIG. 13). In the embodiment, the flash device 23 is integrated into the portable apparatus 7.

The evaluation unit 6 outputs the assignment of the upper cutting blade image of the upper cutting blade 4 of the saw chain 1, the sharpness condition of which is to be determined, to the sharp condition or the dull condition in the form of a display. For this purpose, a display 24 is provided. The display 24 is integrated into the portable apparatus 7 in the embodiment. It is displayed on the display 24 whether the examined saw chain 1 is categorized as sharp or dull.

The evaluation unit 6 outputs a directive in dependence on the assignment of the examined saw chain 1 to the sharp condition or to the dull condition. The directive can include, for example, outputting an instruction to resharpen the saw chain 1. Such an instruction to resharpen the saw chain 1 can comprise the specification of a required tool, in particular of a specific file type.

The directive can also include, for example, outputting a purchase recommendation for a replacement part. The replacement part can in particular be a new saw chain 1, a new sprocket, or a new guide bar 8. It is also possible that a purchase recommendation is output for multiple replacement parts, in particular for an arbitrary combination of the mentioned replacement parts.

It can be provided that at least two, in particular at least three upper cutting blade images are made of at least two or in particular at least three different upper cutting blades 4 of the saw chain 1. In particular, the evaluation unit 6 evaluates all of the at least two or all of the at least three upper cutting blade images to decide whether the saw chain 1 is to be assigned to the dull condition or the sharp condition. With an odd number of the evaluated upper cutting blade images, the evaluation unit 6 counts whether the examined upper cutting blade images were categorized in a majority as sharp or as dull. The majority decides as to whether the entire saw chain 1 is assigned to the sharp condition or the dull condition.

Figure 14:
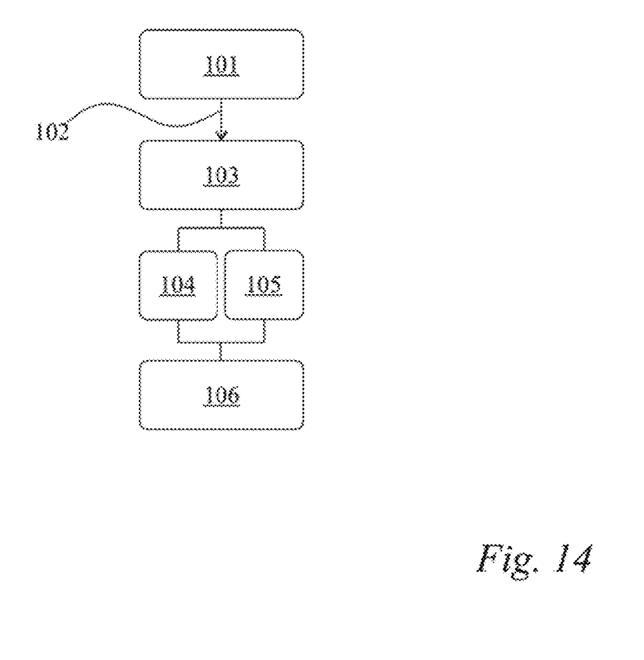

FIG. 14 shows a method sequence in a flow chart. In method step 101, the upper cutting blade image is recorded using the imaging device 5. In 102, the upper cutting blade image is transferred in digital form to the evaluation unit 6, which assigns it to the sharp condition 104 or the dull condition 105. A directive 106 is output on the basis of the ascertained sharpness condition 104, 105 of the saw chain 1.

It is understood that the foregoing description is that of the preferred embodiments of the invention and that various changes and modifications may be made thereto without departing from the spirit and scope of the invention as defined in the appended claims.

What is claimed is:

1. A method for determining a sharpness condition of a saw chain of a chain saw, wherein the saw chain includes at least one cutting link having an upper cutting blade, wherein the upper cutting blade has a width of less than 500 micrometers, wherein an upper cutting blade said to be sharp has a width of the method comprising:
    providing a reference saw chain defined by a sharp saw chain having an upper cutting blade having a width of less than 50 µm;
    recording an upper cutting blade image of the upper cutting blade of the cutting link via an imaging device;
    performing an evaluation of the upper cutting blade image using an evaluation unit, wherein the evaluation unit includes a first artificial neural network, a sharp condition of the saw chain is defined in the evaluation unit, a dull condition of the saw chain is defined in the evaluation unit, and the saw chain is assigned to the sharp condition or the dull condition on a basis of the upper cutting blade image using the first artificial neural network, wherein the first artificial neural network uses a data set of digital images of upper cutting blades of sharp saw chains and of upper cutting blades of dull saw chains in order to decide whether the saw chain is to be assigned to the dull condition or to the sharp condition; wherein a sharp saw chain of the saw chains of the data set supplies at least 80% of the cutting performance of a reference saw chain in identical working conditions; wherein a dull saw chain supplies at most 65% of the cutting performance of the reference saw chain in identical working conditions; the sharp saw chains are assigned to the sharp condition; and, the dull saw chains are assigned to the dull condition, wherein the evaluation unit is configured to output a directive on a basis of the sharpness condition of the saw chain, wherein the directive includes an instruction to resharpen the saw chain; and,
    wherein the evaluation unit includes at least one second artificial neural network; the second artificial neural network is a convolutional neural network and is trained on recognition of upper cutting blades in upper cutting blade images; wherein, with the aid of the second artificial neural network before the assignment of the upper cutting blade image to the sharp condition or the dull condition via the first artificial neural network, a region of the upper cutting blade image in which the upper cutting blade is located is selected; and, the upper cutting blade image is cropped to the region.

2. The method of claim 1, wherein the upper cutting blade image is recorded under undefined light conditions at an undefined angle.

3. The method of claim 1, wherein the upper cutting blade image is transferred in digital form to the evaluation unit.

4. The method of claim 1, wherein the upper cutting blade image has a resolution of at least 10 pixels/millimeter.

5. The method of claim 1, wherein the upper cutting blade image has a resolution of at most 128 pixels/millimeter.

6. The method of claim 1, wherein the probability of success for a correct assignment of the upper cutting blade image to the sharp condition or the unsharp condition is at least 80% when the upper cutting blade image being evaluated has a resolution of at most 128 pixels/millimeter.

7. The method of claim 1, wherein the imaging device has an image sensor having at most 12 megapixels, and the image sensor has a maximum size of 7.2 millimeters×5.4 millimeters.

8. The method of claim 1, wherein precisely two conditions for the sharpness condition of the saw chain are defined in the evaluation unit.

9. The method of claim 1, wherein the upper cutting blade image is recorded using a flash.

10. The method of claim 1, wherein at least two upper cutting blade images of at least two different upper cutting blades of the saw chain are recorded; and, the evaluation unit evaluates the at least two upper cutting blade images to decide whether the saw chain is to be assigned to the dull condition or the sharp condition.

11. The method of claim 1, wherein the imaging device and the evaluation unit are integrated together into a single portable apparatus.

12. The method of claim 1, wherein both the first artificial neural network for assigning the upper cutting blade image to the sharp condition or to the dull condition and the second artificial neural network for selecting the region of the upper cutting blade image in which the upper cutting blade is located are part of the evaluation unit.

* * * * *